US012436479B2

(12) United States Patent
Nagayama et al.

(10) Patent No.: US 12,436,479 B2
(45) Date of Patent: Oct. 7, 2025

(54) CARRIER FOR FORMING ELECTROPHOTOGRAPHIC IMAGE, DEVELOPER FOR FORMING ELECTROPHOTOGRAPHIC IMAGE, ELECTROPHOTOGRAPHIC IMAGE FORMING METHOD, ELECTROPHOTOGRAPHIC IMAGE FORMING APPARATUS, AND PROCESS CARTRIDGE

(71) Applicants: Masashi Nagayama, Shizuoka (JP); Kousuke Suzuki, Shizuoka (JP); Hiroyuki Kishida, Shizuoka (JP); Tohru Suganuma, Shizuoka (JP); Minoru Masuda, Shizuoka (JP); Kento Takeuchi, Shizuoka (JP); Kaede Masuko, Shizuoka (JP)

(72) Inventors: Masashi Nagayama, Shizuoka (JP); Kousuke Suzuki, Shizuoka (JP); Hiroyuki Kishida, Shizuoka (JP); Tohru Suganuma, Shizuoka (JP); Minoru Masuda, Shizuoka (JP); Kento Takeuchi, Shizuoka (JP); Kaede Masuko, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 938 days.

(21) Appl. No.: 17/457,693

(22) Filed: Dec. 6, 2021

(65) Prior Publication Data

US 2022/0187729 A1 Jun. 16, 2022

(30) Foreign Application Priority Data

Dec. 10, 2020 (JP) ................................ 2020-204803

(51) Int. Cl.
*G03G 9/107* (2006.01)
*G03G 9/113* (2006.01)

(52) U.S. Cl.
CPC ......... *G03G 9/1085* (2020.08); *G03G 9/1075* (2013.01); *G03G 9/1131* (2013.01); *G03G 9/1136* (2013.01)

(58) Field of Classification Search
CPC .............................. G03G 9/113; G03G 9/1139
See application file for complete search history.

(56) References Cited

U.S. PATENT DOCUMENTS

2007/0048650 A1* 3/2007 Inoue .................. G03G 9/1075 430/111.41
2011/0171573 A1 7/2011 Sakata et al.
(Continued)

FOREIGN PATENT DOCUMENTS

CN 102854777 * 1/2013 ........... G03G 9/1075
JP 54-155048 12/1979
(Continued)

OTHER PUBLICATIONS

Translation of CN 102854777.*
Translation of JP 4323684.*
Translation of JP 2017-203852.*

*Primary Examiner* — Peter L Vajda
(74) *Attorney, Agent, or Firm* — Grüneberg and Myers PLLC

(57) ABSTRACT

A carrier for forming an electrophotographic image is provided. The carrier comprises a core particle and a coating layer coating the core particle. The coating layer contains chargeable particles and a dispersant. The carrier has an apparent density of from 2.0 g/cm$^3$ or greater but less than 2.5 g/cm$^3$.

16 Claims, 1 Drawing Sheet

(56) References Cited

U.S. PATENT DOCUMENTS

| | | | |
|---|---|---|---|
| 2014/0080052 A1 | 3/2014 | Yaguchi et al. | |
| 2015/0078788 A1 | 3/2015 | Koike et al. | |
| 2020/0166867 A1* | 5/2020 | Nagayama | G03G 9/1131 |
| 2020/0183297 A1 | 6/2020 | Murata et al. | |
| 2020/0319571 A1 | 10/2020 | Takeuchi et al. | |

FOREIGN PATENT DOCUMENTS

| | | | | |
|---|---|---|---|---|
| JP | 56-075659 | | 6/1981 | |
| JP | 57-040267 | | 3/1982 | |
| JP | 57-168255 | | 10/1982 | |
| JP | 58-108548 | | 6/1983 | |
| JP | 58-108549 | | 6/1983 | |
| JP | 58-117555 | | 7/1983 | |
| JP | 59-166968 | | 9/1984 | |
| JP | 2-079862 | | 3/1990 | |
| JP | 4-360156 | | 12/1992 | |
| JP | 5-273789 | | 10/1993 | |
| JP | 5-303238 | | 11/1993 | |
| JP | 6-202381 | | 7/1994 | |
| JP | 8-006307 | | 1/1996 | |
| JP | 11-174740 | | 7/1999 | |
| JP | 2006-079022 | | 3/2006 | |
| JP | 4323684 | * | 6/2009 | G03G 9/107 |
| JP | 2010-117519 | | 5/2010 | |
| JP | 2011-145397 | | 7/2011 | |
| JP | 2011-209678 | | 10/2011 | |
| JP | 2014-077974 | | 5/2014 | |
| JP | 2015-055864 | | 3/2015 | |
| JP | 2017-203852 | * | 11/2017 | G03G 9/113 |
| JP | 2020-024274 | | 2/2020 | |
| JP | 2021-081514 | | 5/2021 | |

* cited by examiner

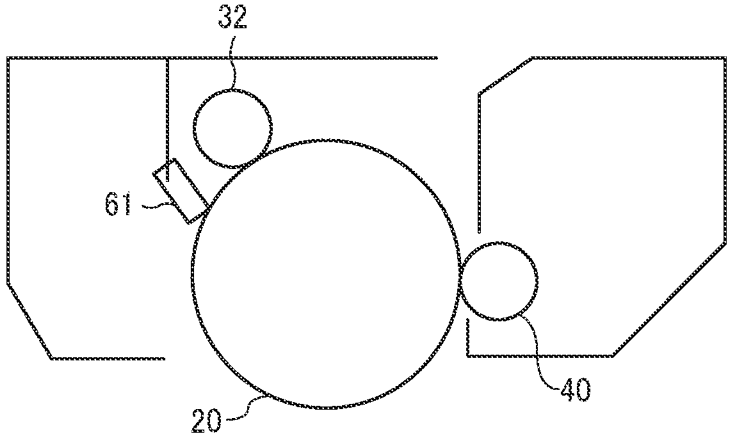
32
61
20
40

CARRIER FOR FORMING ELECTROPHOTOGRAPHIC IMAGE, DEVELOPER FOR FORMING ELECTROPHOTOGRAPHIC IMAGE, ELECTROPHOTOGRAPHIC IMAGE FORMING METHOD, ELECTROPHOTOGRAPHIC IMAGE FORMING APPARATUS, AND PROCESS CARTRIDGE

CROSS-REFERENCE TO RELATED APPLICATIONS

This patent application is based on and claims priority pursuant to 35 U.S.C. § 119(a) to Japanese Patent Application No. 2020-204803, filed on Dec. 10, 2020, in the Japan Patent Office, the entire disclosure of which is hereby incorporated by reference herein.

BACKGROUND

Technical Field

The present disclosure relates to a carrier for forming an electrophotographic image, a developer for forming an electrophotographic image, an electrophotographic image forming method, an electrophotographic image forming apparatus, and a process cartridge

Description of the Related Art

Generally, in image forming methods such as electrophotography and electrostatic photography, a developer obtained by stir-mixing a toner and a carrier is used to develop an electrostatic latent image formed on a latent image bearer. The developer is required to be an appropriately charged mixture. As a method for developing an electrostatic latent image, a method using a two-component developer obtained by mixing a toner and a carrier (hereinafter "two-component development system") and another method using a one-component developer free of carrier (hereinafter "one-component development system") are known. The two-component development system is advantageous over the one-component development system in maintaining high image quality over an extended period of time because the carrier provides a wide area for triboelectrically charging the toner and has stable chargeability. The two-component development system is often used particularly in high-speed machines since the capability of supplying toner to the developing region is high. In addition, due to the above-described advantages, the two-component development system is widely employed in digital electrophotographic systems that visualize an electrostatic latent image formed on a photoconductor with a laser beam.

Various attempts have been made to increase the durability of carriers used in such two-component development systems. For example, there has been an attempt to coating a carrier with a suitable resin material for the purpose of preventing toner from adhering to the surface of the carrier, forming a uniform surface on the carrier, preventing oxidation of the surface, preventing a decrease in moisture sensitivity, extending the lifespan of the developer, protecting the photoconductor from scratch or abrasion by the carrier, controlling the charge polarity, or adjusting the charge amount.

SUMMARY

In accordance with some embodiments of the present invention, a carrier for forming an electrophotographic image is provided. The carrier comprises a core particle and a coating layer coating the core particle. The coating layer contains chargeable particles and a dispersant. The carrier has an apparent density of from 2.0 g/cm$^3$ or greater but less than 2.5 g/cm$^3$.

BRIEF DESCRIPTION OF THE DRAWING

A more complete appreciation of the disclosure and many of the attendant advantages and features thereof can be readily obtained and understood from the following detailed description with reference to the accompanying drawing, wherein the drawing is a schematic diagram illustrating a process cartridge according to an embodiment of the present invention.

The accompanying drawing is intended to depict embodiments of the present invention and should not be interpreted to limit the scope thereof. The accompanying drawing is not to be considered as drawn to scale unless explicitly noted.

DETAILED DESCRIPTION

The terminology used herein is for the purpose of describing particular embodiments only and is not intended to be limiting of the present invention. As used herein, the singular forms "a," "an," and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a carrier for forming an electrophotographic image is provided that has carrier deposition resistance (i.e., an ability not to cause carrier deposition) and ghost resistance (i.e., an ability not to cause ghost images) while maintaining a stable charging ability for an extended period of time.

Embodiments of the present invention are described in detail below.

The present invention can be achieved by the following embodiments (1) to (16).

(1) A carrier for forming an electrophotographic image, comprising:

a core particle; and a coating layer coating the core particle, the coating layer containing chargeable particles and a dispersant, wherein the carrier has an apparent density of from 2.0 g/cm$^3$ or greater but less than 2.5 g/cm$^3$.

(2) The carrier according to (1), wherein the coating layer further contains a defoamer.

(3) The carrier according to (1) or (2), wherein the core particle has an internal void ratio of 0.0% or greater but less than 2.0%.

(4) The carrier according to any one of (1) to (3), wherein the core particle has a surface roughness Rz of 2.0 μm or more but less than 3.0 μm.

(5) The carrier according to any one of (1) to (4), wherein the chargeable particles comprise at least one member selected from the group consisting of barium sulfate, zinc oxide, magnesium oxide, magnesium hydroxide, and hydrotalcite.

(6) The carrier according to any one of (1) to (5), wherein the chargeable particles comprise barium sulfate, and an amount of barium exposed at a surface of the coating layer is 0.1% by atom or greater.

(7) The carrier according to any one of (1) to (6), w % herein the coating layer further contains inorganic particles other than the chargeable particles.

(8) The carrier according to (7), wherein the inorganic particles comprise at least one member selected from the group consisting of:

a doped tin oxide doped with at least one member selected from the group consisting of tungsten, indium, phosphorus, tungsten oxide, indium oxide, and phosphorous oxide; and particles each comprising a base particle and the doped tin oxide on a surface of the base particle.

(9) The carrier according to any one of (1) to (8), wherein the core particle comprises manganese ferrite.

(10) The carrier according to any one of (1) to (9), wherein the carrier has a magnetization of 56 $Am^2/kg$ or greater but less than 73 $Am^2/kg$ in a magnetic field of 1,000 Oe that is equal to 79.58 kA/m.

(11) The carrier according to any one of (1) to (10), wherein the dispersant comprises a phosphate ester-based surfactant.

(12) The carrier according to any one of (2) to (11), wherein the defoamer comprises a silicone-based defoamer.

(13) A developer for forming an electrophotographic image, comprising the carrier according to any one of (1) to (12).

(14) An electrophotographic image forming method comprising forming an electrostatic latent image on an electrostatic latent image bearer:

developing the electrostatic latent image formed on the electrostatic latent image bearer with the developer according to (13) to form a toner image;

transferring the toner image formed on the electrostatic latent image bearer onto a recording medium, and fixing the toner image on the recording medium.

(15) An electrophotographic image forming apparatus comprising:

an electrostatic latent image bearer;

a charger configured to charge the electrostatic latent image bearer;

an irradiator configured to form an electrostatic latent image on the electrostatic latent image bearer:

a developing device containing the developer according to (13), the developing device configured to develop the electrostatic latent image formed on the electrostatic latent image bearer with the developer to form a toner image;

a transfer device configured to transfer the toner image formed on the electrostatic latent image bearer onto a recording medium; and a fixing device configured to fix the toner image on the recording medium.

(16) A process cartridge detachably mountable on an electrophotographic image forming apparatus, comprising an electrostatic latent image bearer;

a charger configured to charge the electrostatic latent image bearer;

a developing device containing the developer according to (13), the developing device configured to develop the electrostatic latent image formed on the electrostatic latent image bearer with the developer to form a toner image:

a cleaner configured to clean the electrostatic latent image bearer.

Surface-coated carriers are known. The surface-coated carriers tend to have a lower magnetization than their core particles before being coated. This is because the coating material, i.e., resin, has no magnetization. When the coating layer further contains non-magnetic inorganic particles (e.g., barium sulfate), the magnetization becomes much lower. The lower the magnetization of the carrier, the weaker the magnetic binding force from a developer bearer, and the higher possibility the occurrence of carrier deposition caused due to the counter charge or charge injected from the developer bearer.

In recent years, there has been an increasing demand for higher image quality in the market, and "ghost", which is one type of abnormal images, is recognized as a major problem.

In addition, to maintain high image quality for an extended period of time, charge properties are required to be stable. One of the factors that hinders the stability of charge over time is accumulation of toner components on the carrier surface (such a carrier is hereinafter referred to as "spent carrier"). In many cases, accumulation of toner components starts from recessed portions on the surface of the carrier, and the recessed portions serve as accumulation cavities for the toner components.

The recessed portions on the surface of the carrier are generally formed depending on the shape of the core particle and can be leveled to some extent with provision of a resin coating layer. However, when coating the core particle, the air may be trapped between the recessed portions (i.e., grooves) on the surface of the core particle and the coating layer. In particular, when the core particle has a large number of recessed and projected portions on the surface thereof, or when the shapes of the recessed and projected portions are prominently extending in the longitudinal direction (i.e., direction in which the shape index Rz indicating surface roughness increases), the probability of the air getting trapped in the recessed portions is extremely high. If the air gets trapped inside the coating layer, in the case of a carrier manufacturing process in which a baking step is performed after the coating step, the air in the coating layer expands and bursts by heat in the baking step, so that crater-like recessed portions are formed on the surface of the coating layer. These recessed portions serve as accumulation cavities for toner components or starting points of accumulation of toner components.

As described above, when the carrier contains chargeable particles in the coating layer, the carrier is suppressed from lowering its charging ability during supply and consumption of toner over a high image area, due to the charge-imparting function of the chargeable particles. However, since the magnetic moment of one carrier particle is small and the magnetic binding force received from the developer bearer is low, there is a drawback that the carrier deposition resistance is low.

The magnetic moment of the carrier particle mostly depends on the magnetization of the core particle. The magnetization itself is determined by the composition of the core particle. Therefore, in order to increase the magnetic moment per core particle to compensate a magnetic moment decrease caused by the presence of the chargeable particles, it is effective to increase the mass per core particle as much as possible.

On the other hand, as described above, ghost images are generated by a developing potential rise caused due to sleeve contamination. However, even in a case where the same degree of sleeve contamination is caused, carriers with a lower apparent density are more capable of reducing the degree of ghost images. This is because the lower the apparent density of the carrier, the higher the space occupancy of the carrier in the developing region (that is the space between the latent image bearer and the developing sleeve), and the lower the electrical resistance of the bulk carrier. It is considered that, when the electrical resistance of the bulk carrier is low, the mirror image charge easily moves inside the carrier in the direction of canceling the potential raised by sleeve contamination, so that the potential rise is alleviated and generation of ghost images is suppressed. In other words, generation of ghost image is more likely to be caused when the apparent density of the carrier is increased.

One of the factors that determines the apparent density of the bulk carrier is the mass of one carrier particle. Since the apparent density of the bulk carrier tends to increase as the mass of one carrier particle increases, it is difficult to keep the apparent density of the bulk carrier low while increasing the mass of one carrier particle. Therefore, there is a trade-off between carrier deposition resistance and ghost resistance, and it has been difficult to achieve both carrier deposition resistance and ghost resistance at high levels.

The inventors of the present invention have made diligent studies to solve the above-described problems.

As a result, they have found that the above-described problems can be solved by a carrier having an apparent density of 2.0 g/cm$^3$ or greater but less than 2.5 g/cm$^3$ and having a coating layer containing chargeable particles and a dispersant.

Further, the inventors of the present invention have found that, even in the case of a carrier whose magnetic moment tends to be low due to inclusion of chargeable particles in the coating layer, it is preferable to reduce the internal void ratio of the core particle to less than 2.0%, in order to efficiently increase the magnetic moment of one carrier particle by maximizing the mass of one carrier particle while minimizing an increase of the apparent density.

However, there is a trade-off relationship between the apparent density of the carrier being 2.0 g/cm$^3$ or greater but less than 2.5 g/cm$^3$ and the internal void ratio of the core particle being less than 2.0%. This problem may be solved by, for example, adjustment of the surface roughness of the carrier. For example, when the surface roughness of the carrier is increased, the apparent density and internal void ratio can be within the above ranges without reducing the mass per carrier particle, thus achieving both carrier deposition resistance and ghost resistance at high levels.

The surface roughness of the carrier is effected by the surface roughness of the core particle. As a result of studies by the inventors of the present invention, it has been found that the apparent density of the resultant carrier can be more efficiently reduced when the Rz (i.e., maximum height) of the core particle is 2.0 μm or more. Further, when the Rz is less than 3.0 μm, projected and recessed portions on the surface of the core particle are more leveled, the projected portions of the core particle are less likely to be exposed at the surface of the carrier during a long-term use of the carrier, and the lifespan of the carrier is extended.

The Rz of the core particle refers to the maximum height Rz that is an index of surface profile (i.e., roughness profile) defined in Japanese Industrial Standards (JIS) B0601:2001 (ISO1365-1).

However, when the surface roughness of the core particle is increased to decrease the apparent density, in particular, when the surface roughness is increased in a direction in which the value of Rz increases, the air is likely to get trapped in the coating layer as described above. When the trapped air bursts by thermal expansion, crater-like recessed portions are formed, which may cause accumulation of toner components. The inventors of the present invention have conducted extensive studies on this issue and have found that, when the coating layer contains a dispersant, the recessed portions on the surface of the core particle get filled with the resin layer without trapping the air therein. Thus, generation of crater-like recessed portions caused by burst of the trapped air is prevented, and a decrease in charge stability due to the spent carrier can be suppressed.

The dispersant is often used to promote dispersion of fine particles in the coating layer. A reason why dispersion is promoted is that the dispersant functions as a surface activating agent to improve wettability of a coating liquid that forms the coating layer with respect to the surfaces of inorganic particles and aggregation of the inorganic particles that have been formed into secondary particles is released. The original function of the dispersant is to increase the wettability between the coating liquid and inorganic materials. This effect is exerted not only on the inorganic particles but also on the surface of the core particle. When the wettability of the coating liquid with respect to the core particle increases, the coating liquid easily enters the recessed portions on the surface of the core particle and pushes out the air present therein, so that the air is less likely to get trapped in the recessed portions of the core particle. As a result, crater-like recessed portions formed by burst of the trapped air are reduced, and accumulation of toner components is reduced.

Since the surface activating effect of the dispersant is lost by the presence of inorganic particles in the coating liquid, the addition amount of the dispersant is preferably determined based on the amount of the inorganic particles. Specifically, the addition amount of the dispersant is preferably 0.5 parts by mass or more and 10.0 parts by mass or less with respect to 100 parts by mass of the inorganic particles in total in the coating liquid. When the addition amount of the dispersant is 0.5 parts by mass or more, the effect of improving wettability with respect to the surface of the core particle becomes sufficient, and the air hardly remains in the grooves of the recessed portions of the core particle. On the other hand, when the addition amount of the dispersant is 10.0 parts by mass or less, the proportion of the resin in solid contents of the coating layer becomes appropriate, the strength of the coating layer is improved, wear of the coating layer and liberation of inorganic particles are suppressed during a long-term use, and the image quality is stable.

In the present disclosure, the dispersant refers to a surface activating agent (also referred to as "surfactant") having a function of promoting dispersion of inorganic particles in the coating liquid, and the material thereof is not particularly limited. Examples thereof include phosphate ester-based surfactants, sulfate ester-based surfactants, sulfonic-acid-based surfactants, and carboxylic-acid-based surfactants. In particular, phosphate-based surfactants are preferred for their efficient expression of their functions.

Examples of phosphate ester-based dispersants include, but are not limited to, SOLSPERSE 2000, 2400, 2600, 2700, and 2800 (products of Zeneca), AJISPER PB711, PA111, PB811, and PW911 (products of Ajinomoto Co., Inc.), EFKA-46, 47, 48, and 49 (products of EFKA Chemicals B.V.), DISPERBYK 160, 162, 163, 166, 170, 180, 182, 184, and 190 (products of BYK-Chemie GmbH), and FLOWLEN DOPA-158, 22, 17. G-700, TG-720W, and 730W (products of Kyoeisha Chemical Co., Ltd.).

In the field of coating, a defoamer is often used in combination with a dispersant. This is because, since the dispersant contains a surfactant as a main component, bubbles are often generated in a liquid. The defoamer is used to eliminate the bubbles before the coated surface is dried and make the dried coated surface smooth.

The inventors of the present invention have found that the combined use of the dispersant with the defoamer more suppresses generation of crater-like recessed portions even when the air in the recessed portions of the core particle has been pushed out by the dispersant.

Even when the air has been pushed out from the recessed portions on the surface of the core particles by the effect of the dispersant, if the viscosity of the coating liquid is high, the pushed-out air remains in the coating liquid layer and becomes bubbles, and thus formation of crater-like recessed portions cannot be completely suppressed. The combined use of the defoamer with the dispersant makes it possible to eliminate air bubbles generated from the air that has been pushed out from the recessed portions of the core particle by the effect of the dispersant but has remained in the coating layer, thereby more effectively suppressing formation of crater-shaped recessed portions.

As the defoamer, commercially-available defoamers may be used, which have a foam breaking action, a foam suppressing action, or a deaerating action. Specific materials thereof include, but are not limited to, silicone-based, acrylic-based, and vinyl-based materials. Among these, silicone-based defoamers are particularly effective.

The defoaming effect is exerted depending on the balance between compatibility and incompatibility with a solvent. In particular, silicone-based defoamers have a good balance between compatibility and incompatibility and exerts a high defoaming effect even with a small amount.

The addition amount of the defoamer should be adjusted depending on the ability of the defoamer, but is preferably in the range of from 1.0 to 10.0 parts by mass with respect to 100 parts by mass of the coating liquid for forming the coating layer.

Examples of commercially-available silicone-based defoamers include, but are not limited to, KS-530, KF-96, KS-7708, KS-66, and KS-69 (products of Silicone Division of Shin-Etsu Chemical Co., Ltd.), TSF451, THF450, TSA720, YSA02, TSA750, and TSA750S (products of Momentive Performance Materials Inc.), BYK-065, BYK-066N, BYK-070, BYK-088, and BYK-141 (products of BYK-Chemie GmbH), and DISPARLON 1930N, DISPARLON 1933, and DISPARLON 1934 (products of Kusumoto Chemicals, Ltd.).

Since the carrier according to an embodiment of the present invention contains chargeable particles in the coating layer, the carrier is suppressed from lowering its charging ability during supply and consumption of toner over a high image area due to the charge-imparting function of the chargeable particles, thereby suppressing the occurrence of abnormal phenomena such as toner scattering and background fouling caused by a charge decrease.

The chargeable particles here refer to particles having a relatively low ionization potential, and more specifically, particles having a lower ionization potential than alumina particles (AA-03, product of Sumitomo Chemical Co., Ltd.). Preferred materials include barium sulfate, zinc oxide, magnesium oxide, magnesium hydroxide, and hydrotalcite, and particularly suitable materials include barium sulfate. The ionization potential is measured using an instrument PYS-202, product of Sumitomo Heavy Industries, Ltd.

The proportion of the chargeable particles in the coating layer is preferably from 3% to 50% by mass, and more preferably from 6% to 27% by mass.

When the chargeable particles comprise barium sulfate, the amount of barium exposed at the surface of the coating layer is preferably 0.1% by atom or greater. Since charge exchange for charging the toner is performed on the surface layer of the coating layer, in the carrier with an appropriate exposure of barium sulfate to the surface of the coating layer, the charging ability of barium sulfate is greatly exerted even without a great scraping of the coating layer during a long-term use of the carrier. When the amount of barium exposed at the surface of the coating layer is 0.1% by atom or greater, the charging ability is exerted even not only when the coating layer has been scraped off but also when the carrier has been spent by adherence of toner components to the surface layer of the carrier during a long-term use, which is preferred.

The amount of barium exposed at the surface of the coating layer is more preferably from 0.1% to 0.2% by atom.

The amount of exposure of barium sulfate at the surface layer of the carrier can be detected as the atomic percent of barium determined by a peak analysis performed by an instrument AXIS/ULTRA (product of Shimadzu/KRATOS). The beam irradiation region of the instrument is approximately 900 μm×600 μm. The detection is performed at each of 17 beam irradiation regions in each of 25 carrier particles. The penetration depth is from 0 to nm. Information near the surface layer of the carrier is detected.

Specifically, the measurement is carried out by setting the measurement mode to Al: 1486.6 eV, the excitation source to monochrome (Al), the detection method to spectrum mode, and the magnet lens to OFF. First, the detected elements are identified by a wide scan, and then peaks for each detected element are detected by a narrow scan. After that, the atomic percent of barium with respect to all detected elements is calculated using the peak analysis software program attached to the instrument.

The particle diameter of each of the chargeable particles is not particularly limited. However, when the average thickness of the coating layer is T, the particle diameter h preferably satisfies the following formula. $h/2 \leq T \leq h$ By making the particle diameter of the chargeable particle larger than the thickness of the coating layer, it becomes more likely that the chargeable particle protrudes from the surface of the coating layer. When the top portion of the chargeable particle protrudes from the resin coating layer, it functions as a spacer between an object to be rubbed and the resin of the coating layer when the carrier particles are rubbed with each other or with an accommodating container wall or a conveyance jig, thus extending the lifespan of the coating layer. In addition, it becomes more likely that the chargeable particle comes into contact with the toner, which is preferable in terms of charge imparting function. Further, when the thickness T of the coating layer is larger than the half of the particle diameter of the chargeable particle, the chargeable particle is firmly captured in the coating layer, so that the chargeable particle becomes less likely to release from the coating layer.

The particle diameter of the chargeable particle can be measured by conventionally known methods. For example, prior to manufacture of the carrier, the particle diameter of the chargeable particle can be measured using NANOTRAC UPA series (product of Nikkiso Co., Ltd.). As another example, after manufacture of the carrier, the particle diameter can be measured by cutting the coating layer on the carrier surface with a focused ion beam (FIB) and observing the cross-section by scanning electron microscopy (SEM) and/or energy-dispersive X-ray spectrometry (EDX). Another non-limiting example method is described below.

The carrier is mixed in an embedding resin (DEVCON, product of ITW PP&F JAPAN Co., LTD, two-component mixture, 30-minute curable epoxy resin), left overnight or longer for curing, and mechanically polished to prepare a rough cross-section sample. The cross-section is finished using a cross-section polisher (SM-09010, product of JEOL Ltd.) under an acceleration voltage of 5.0 kV and a beam current of 120 μA. The finished cross-section is photographed using a scanning electron microscope (MERLIN, product of Carl Zeiss AG) under an accelerating voltage of 0.8 kV and a magnification of 30,000 times. The photographed image is incorporated into a TIFF (tagged image file format) image to measure the equivalent circle diameters of 100 barium sulfate particles using IMAGE-PRO PLUS, product of Media Cybernetics, Inc., and the measured values are averaged.

The measurement method is not limited to the above-described methods. The thickness of the coating layer can be measured from the photographed image in the same manner. Since each particle has an individual difference and the thickness of the coating layer varies depending on the location, not only one particle or one location is subjected to the measurement, but a statistically reliable number of particles or locations is subjected to the measurement.

As described above, preferably, the carrier according to an embodiment of the present invention has an internal void ratio of 0.0% or greater but less than 2.0%. As described above, when the internal void ratio is 2.0% or more, the loss of the magnetic moment per particle increases, and the carrier deposition resistance decreases.

The internal void ratio of the carrier can be measured as follows.

First, the carrier is cut, and a cross-section is photographed. Photographing of the cross-section can be performed by conventionally known methods such as scanning electron microscopy (SEM). Next, an area S of the contour of one particle is acquired from the photograph of the cross-section using a conventionally known image analysis software (for example, IMAGE PRO PREMIER, product of Media Cybernetics, Inc.). Similarly, an area s of a void portion inside one particle is acquired, and the void ratio of one particle is calculated from the following formula.

$$\text{Void ratio of one particle [\%]} = (s/S) - 100$$

This procedure is carried out for 60 randomly selected particles, and the average value is taken as the internal void ratio.

The carrier according to an embodiment of the present invention has an apparent density of 2.0 g/cm$^3$ or greater but less than 2.5 g/cm$^3$. As described above, when the apparent density of the carrier is 2.5 g/cm$^3$ or greater, the space occupancy of the carrier particles in the developing region becomes low when an image is developed from the developing roller to the image bearer. Therefore, it becomes difficult for electric charges to move in the developing region through the carrier, and it also becomes difficult to alleviate a potential rise caused due to the toner adhered to the developing sleeve, resulting in easy generation of ghost images. Further, when the apparent density is less than 2.0 g/cm$^3$, the magnetic moment is insufficient, resulting in poor carrier deposition resistance. The apparent density of carrier is measured according to JIS-Z2504:2000.

In addition, the inventors of the present invention have found that the charging ability is more effectively maintained during a long-term use when the chargeable particles are contained in the coating layer, the internal void ratio is adjusted to less than 2.0%, and the surface of the core particle is roughened to make the apparent density less than 2.5 g/cm$^3$, as in the carrier according to an embodiment of the present invention.

Although a reason why this preferred embodiment achieves the above-described effects has not been clarified in detail, the mechanism for this is considered as follows.

As described above, the charging ability of the carrier decreases as toner components accumulate on the surface of the carrier during a long-term use, causing the carrier to be spent. In the case of a carrier having an apparent density of less than 2.5 g/cm$^3$ despite a low internal void ratio, that is, a carrier with large surface irregularities, the projected portions of the carrier function as claws that scrape off components adhered to the surface of the coating layer when the carrier particles rub against or collide with each other in the developing device.

However, if the weight of one carrier particle is small, the energy applied to the carrier particles at the time of rubbing and collision is small, so that the effect of scraping off the adhered components by the projected portions is low. Therefore, when the internal void ratio is lowered to less than 2.0% and the weight per particle is increased as in the carrier according to an embodiment of the present invention, a large amount of energy is applied during scraping, so that the projected portions of the carrier become possible to effectively scrape off the adhered components. As a result, accumulation of the adhered components is suppressed, and a decrease of the charging ability is effectively suppressed.

The carrier according to an embodiment of the present invention contains the chargeable particles in the coating layer. The chargeable particles exert their charging ability upon contact with toner particles. Since the chargeable particles are covered with, for example, a resin in the coating layer, it is necessary to expose the chargeable particles by damaging the resin that is covering the chargeable particles. The scraping performed by the carrier having projected portions and an appropriate weight per particle makes it possible to expose the chargeable particles to develop the charging ability at an early stage and to continue to exert that ability for an extended period of time.

The core particle used for the carrier according to an embodiment of the present invention can be appropriately selected from those known to be used for electrophotographic two-component carriers. In particular, manganese (Mn) ferrite that is a material having a relatively high magnetization is preferred because it is easy to appropriately adjust the magnetic moment per carrier particle in view of carrier deposition resistance.

The carrier has a magnetization of preferably 56 Am$^2$/kg or greater but less than 73 Am$^2$/kg, more preferably 56

$Am^2/kg$ or greater but 63 $Am^2/kg$ or less, in a magnetic field of 1,000 Oe that is equal to 79.58 kA/m.

Even when the internal void ratio is lowered to increase the mass per particle, the magnetic moment per particle does not decrease and carrier deposition is less likely to occur when the magnetization is 56 $Am^2/kg$ or greater. Further, when the magnetization is 56 $Am^2/kg$ or greater, not only carrier deposition is less likely to occur but also scraping off of the adhered components is promoted because the carrier particles on the developer bearer are rubbed with a strong force, which is preferable for maintaining the charging ability of the carrier.

When the magnetization of the carrier is less than 73 $Am^2/kg$, the magnetization is not too high, and it is not likely that the developer whose toner concentration has been lowered after image development enters the developing region again without separating from the developing roller. Therefore, the image density of the solid image after the second round of the developing roller is not decreased, and strip-like abnormal images are not likely to be generated.

In order to bring the magnetization of the carrier into the above-described range, the magnetization of the core particle is preferably 66 $Am^2/kg$ or greater but less than 75 $Am^2/kg$ in a magnetic field of 1,000 Oe.

The magnetization of the core particle of the carrier is measured using a High Sensitivity Vibrating Sample Magnetometer (VSM-P7, product of Toei Industry Co., Ltd.) of use for room temperature. In the measurement, an external magnetic field is continuously applied in the range of from 0 to 1,000 Oe for one cycle to measure a magnetization $\sigma 1000$ in an external magnetic field of 1,000 Oe.

The coating layer may further contain inorganic particles in addition to the chargeable particles. Preferably, the inorganic particles comprise a conductive material for the purpose of adjusting the resistance. Conventionally, carbon black has been widely used as a conductive material. However, when used for a developer for a long term, the carbon black or a piece of resin containing the carbon black may be released from the coating layer of the carrier due to friction or collision between carrier particles or between carrier particles and toner particles, and may be adhered to the toner particles or developed as it is. When the developer is that combined with a toner, especially yellow toner, white toner, or transparent toner, an undesired phenomenon of color turbidity (i.e., color contamination) remarkably appears. Therefore, it is preferable that the conductive material be close to white or colorless as much as possible. Examples of materials having good color and conductive function include, but are not limited to, doped tin oxides that are doped with tungsten, indium, phosphorus, or an oxide of any of these substances. These doped tin oxides can be used as they are or provided to the surfaces of base particles. As the base particles, any known material can be used. Examples thereof include, but are not limited to, aluminum oxide and titanium oxide.

The coating layer may further contain a resin and other components as needed.

Examples of the resin used for the coating layer include, but are not limited to, silicone resins, acrylic resins, and combinations thereof. Acrylic resins have high adhesiveness and low brittleness and thereby exhibit superior wear resistance. At the same time, acrylic resins have a high surface energy. Therefore, when used in combination with a toner which easily cause adhesion, the adhered toner components may be accumulated on the acrylic resin to cause a decrease of the amount of charge. This problem can be solved by using a silicone resin in combination with the acrylic resin. This is because silicone resins have a low surface energy and therefore the toner components are less likely to adhere thereto, which prevents accumulation of the adhered toner components that causes detachment of the coating film. At the same time, silicone resins have low adhesiveness and high brittleness and thereby exhibit poor wear resistance. Thus, it is preferable that these two types or resins be used in a good balance to provide a coating layer having wear resistance to which toner is difficult to adhere. This is because silicone resins have a low surface energy and the toner components are less likely to adhere thereto, which prevents accumulation of the adhered toner components that causes detachment of the coating film.

In the present disclosure, silicone resins refer to all known silicone resins. Examples thereof include, but are not limited to, straight silicone resins consisting of organosiloxane bonds, and modified silicone resins (e.g., alkyd-modified, polyester-modified, epoxy-modified, acrylic-modified, and urethane-modified silicone resins). Specific examples of commercially-available products of the straight silicone resins include, but are not limited to, KR271, KR255, and KR152 (products of Shin-Etsu Chemical Co., Ltd.); and SR2400, SR2406, and SR2410 (products of Dow Corning Toray Silicone Co., Ltd.). Each of these silicone resins may be used alone or in combination with a cross-linking component 0 and/or a charge amount controlling agent. Specific examples of the modified silicone resins include, but are not limited to, commercially-available products such as KR206 (alkyd-modified), KR5208 (acrylic-modified), ES1001N (epoxy-modified), and KR305 (urethane-modified) (products of Shin-Etsu Chemical Co., Ltd.); and SR2115 (epoxy-modified) and SR2110 (alkyd-modified) (products of Dow Corning Toray Silicone Co., Ltd.).

Examples of polycondensation catalysts include, but are not limited to, titanium-based catalysts, tin-based catalysts, zirconium-based catalysts, and aluminum-based catalysts. Among these catalysts, titanium-based catalysts are preferred for their excellent effects, and titanium diisopropoxybis(ethylacetoacetate) is most preferred. The reason for this is considered that this catalyst effectively accelerates condensation of silanol groups and is less likely to be deactivated.

In the present disclosure, acrylic resins refer to all known resins containing an acrylic component and are not particularly limited. Each of these acrylic resins may be used alone or in combination with at least one cross-linking component. Specific examples of the cross-linking component include, but are not limited to, amino resins and acidic catalysts. Specific examples of the amino resins include, but are not limited to, guanamine resins and melamine resins. The acidic catalysts here refer to all materials having a catalytic action. Specific examples thereof include, but are not limited to, those having a reactive group of a completely alkylated type, a methylol group type, an imino group type, or a methylol/imino group type.

More preferably, the coating layer contains a cross-linked product of an acrylic resin and an amino resin. In this case, the coating layers are prevented from fusing with each other while remaining the proper elasticity.

Examples of the amino resin include, but are not limited to, melamine resins and benzoguanamine resins, which can improve charge giving ability of the resulting carrier. To more suitably control charge giving ability of the resulting carrier, a melamine resin and/or a benzoguanamine resin may be used in combination with another amino resin.

Preferred examples of the acrylic resin that is cross-linkable with the amino resin include those having a hydroxyl group and/or a carboxyl group. Those having a hydroxy group are more preferred. In this case, adhesiveness to the core particle and conductive particles is more improved, and dispersion stability of the conductive particles is also improved. In this case, preferably, the acrylic resin has a hydroxyl value of 10 mgKOH/g or more, and more preferably 20 mgKOH/g or more.

Preferably, a composition for forming the coating layer contains a silane coupling agent. In this case, the conductive particles can be reliably dispersed therein.

Specific examples of the silane coupling agent include, but are not limited to, γ-(2-aminoethyl)aminopropyl trimethoxysilane, γ-(2-aminoethyl)aminopropylmethyl dimethoxysilane, γ-methacryloxypropyl trimethoxysilane, N-β-(N-vinylbenzvlaminoethyl)-γ-aminopropyl trimethoxysilane hydrochloride, γ-glycidoxypropyl trimethoxysilane, γ-mercaptopropyl trimethoxysilane, methyl trimethoxysilane, methyl triethoxysilane, vinyl triacetoxysilane, γ-chloropropyl trimethoxysilane, hexamethyldisilazane, γ-anilinopropyl trimethoxysilane, vinyl trimethoxysilane, octadecyldimethyl[3-(trimethoxysilyl)propyl]ammonium chloride, γ-chloropropylmethyl dimethoxysilane, methyl trichlorosilane, dimethyl dichlorosilane, trimethyl chlorosilane, allyl triethoxysilane, 3-aminopropylmethyl diethoxysilane, 3-aminopropyl trimethoxysilane, dimethyl diethoxysilane, 1,3-divinyltetramethyl disilazane, and methacryloxyethyldimethyl(3-trimethoxysilylpropyl)ammonium chloride. Two or more of these materials can be used in combination.

Specific examples of commercially-available products of the silane coupling agents include, but are not limited to, AY43-059, SR6020, SZ6023, SH6026, SZ6032, SZ6050, AY43-310M, SZ6030, SH6040, AY43-026, AY43-031, sh6062, Z-6911, sz6300, sz6075, sz6079, sz6083, sz6070, sz6072, Z-6721. AY43-004, Z-6187, AY43-021, AY43-043, AY43-040, AY43-047, Z-6265, AY43-204M, AY43-048, Z-6403, AY43-206M, AY43-206E, Z6341, AY43-210MC, AY43-083, AY43-101, AY43-013, AY43-158E, Z-6920, and Z-6940 (products of Toray Silicone Co., Ltd.).

Preferably, the proportion of the silane coupling agent to the silicone resin is from 0.1% to 10% by mass. When the proportion of the silane coupling agent is 0.1% by mass or more, adhesion strength between the core particle/conductive particle and the silicone resin is increased to prevent detachment of the coating layer during a long-term use. When the proportion is 10% by mass or less, the occurrence of toner filming is prevented during a long-term use.

The volume average particle diameter of the core particle of the carrier is not particularly limited. For preventing the occurrence of carrier deposition and carrier scattering, the volume average particle diameter is preferably 20 μm or more. For preventing the production of abnormal images (e.g., stripes made of carrier particles) and deterioration of image quality, the volume average particle diameter is preferably 100 μm or less. In particular, a core particle having a volume average particle diameter of from 20 to 60 μm can meet a recent demand for higher image quality. The volume average particle diameter can be measured using, for example, a particle size distribution analyzer MICROTRAC Model HRA9320-X100 (product of Nikkiso Co., Ltd.).

The carrier according to an embodiment of the present invention may be manufactured by, for example, dissolving the resin, etc., in a solvent to prepare a coating liquid and uniformly coating the surface of the core particle with the coating liquid by a known coating method, followed by drying and baking. Examples of the coating method include, but are not limited to, dipping, spraying, and brush coating.

The solvent is not particularly limited and can be suitably selected to suit to a particular application. Specific examples thereof include, but are not limited to, toluene, xylene, methyl ethyl ketone, methyl isobutyl ketone, cellosolve, and butyl acetate.

The baking method is not particularly limited and can be suitably selected to suit to a particular application. Specific examples thereof include, but are not limited to, external heating methods and internal heating methods.

The baking instrument is not particularly limited and can be suitably selected to suit to a particular application. Specific examples thereof include, but are not limited to, stationary electric furnaces, fluxional electric furnaces, rotary electric furnaces, burner furnaces, and instruments equipped with microwave.

The average thickness of the coating layer is preferably 0.2 μm or greater but 1.0 μm or less, and more preferably 0.4 μm or greater but 0.8 μm or less.

Here, the average thickness of the coating layer can be measured by, for example, observing a cross-section of the carrier using a transmission electron microscope (TEM).

A developer according to an embodiment of the present invention contains the carrier according to an embodiment of the present invention, and may further contain a toner.

The toner may contain a binder resin, a colorant, a release agent, a charge controlling agent, an external additive, etc. The toner may be any of monochrome toner, color toner, white toner, transparent toner, or metallic luster toner. The toner may be manufactured by a conventionally known method such as a pulverization method and a polymerization method, or any other method.

In a typical pulverization method, toner materials are melt-kneaded, the melt-kneaded product is cooled and pulverized into particles, and the particles are classified by size, thus preparing mother particles. To more improve transferability and durability, an external additive is added to the mother particles, thus obtaining a toner.

Specific examples of the kneader for kneading the toner materials include, but are not limited to, a batch-type double roll mill; BANBURY MIXER; double-axis continuous extruders such as TWIN SCREW EXTRUDER KTK (product of Kobe Steel, Ltd.), TWIN SCREW COMPOUNDER TEM (product of Toshiba Machine Co., Ltd.), MIRACLE K.C.K (product of Asada Iron Works Co., Ltd.), TWIN SCREW EXTRUDER PCM (product of Ikegai Co., Ltd.), and KEX EXTRUDER (product of Kurimoto, Ltd.); and single-axis continuous extruders such as KOKNEADER (product of Buss Corporation).

The cooled melt-kneaded product may be coarsely pulverized by a HAMMER MILL or a ROTOPLEX and thereafter finely pulverized by a jet-type pulverizer or a mechanical pulverizer. Preferably, the pulverization is performed such that the resulting particles have an average particle diameter of from 3 to 15 μm.

When classifying the pulverized melt-kneaded product, a wind-power classifier may be used. Preferably, the classification is performed such that the resulting mother particles have an average particle diameter of from 5 to 20 μm.

The external additive is added to the mother particles by being stir-mixed therewith by a mixer, so that the external additive gets adhered to the surfaces of the mother particles while being pulverized.

Specific examples of the binder resin include, but are not limited to, homopolymers of styrene or styrene derivatives (e.g., polystyrene, poly-p-styrene, polyvinyl toluene), styrene-based copolymers (e.g., styrene-p-chlorostyrene copolymer, styrene-propylene copolymer, styrene-vinyltoluene copolymer, styrene-methyl acrylate copolymer, styrene-ethyl acrylate copolymer, styrene-methacrylic acid copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ether copolymer, styrene-vinyl methyl ketone copolymer, styrene-butadiene copolymer, styrene-isoprene copolymer, styrene-maleate copolymer), polymethyl methacrylate, polybutyl methacrylate, polyvinyl chloride, polyvinyl acetate, polyethylene, polyester, polyurethane, epoxy resin, polyvinyl butyral, polyacrylic acid, rosin, modified rosin, terpene resin, phenol resin, aliphatic or aromatic hydrocarbon resin, and aromatic petroleum resin. Two or more of these resins can be used in combination.

Specific examples of usable binder resins for pressure fixing include, but are not limited to: polyolefins (e.g., low-molecular-weight polyethylene, low-molecular-weight polypropylene), olefin copolymers (e.g., ethylene-acrylic acid copolymer, ethylene-acrylate copolymer, styrene-methacrylic acid copolymer, ethylene-methacrylate copolymer, ethylene-vinyl chloride copolymer, ethylene-vinyl acetate copolymer, ionomer resin), epoxy resin, polyester resin, styrene-butadiene copolymer, polyvinyl pyrrolidone, methyl vinyl ether-maleic acid anhydride copolymer, maleic-acid-modified phenol resin, and phenol-modified terpene resin. Two or more of these resins can be used in combination.

Specific examples of usable colorants (i.e., pigments and dyes) include, but are not limited to, yellow pigments such as Cadmium Yellow, Mineral Fast Yellow, Nickel Titanium Yellow, Naples Yellow, Naphthol Yellow S. Hansa Yellow G, Hansa Yellow 10G, Benzidine Yellow GR, Quinoline Yellow Lake, Permanent Yellow NCG, and Tartrazine Lake; orange pigments such as Molybdenum Orange, Permanent Orange GTR, Pyrazolone Orange, Vulcan Orange, Indanthrene Brilliant Orange RK, Benzidine Orange G, and Indanthrene Brilliant Orange GK; red pigments such as Red Iron Oxide, Cadmium Red, Permanent Red 4R, Lithol Red, Pyrazolone Red, Watching Red calcium salt, Lake Red D. Brilliant Carmine 6B, Eosin Lake, Rhodamine Lake B, Alizarin Lake, and Brilliant Carmine 3B; violet pigments such as Fast Violet B and Methyl Violet Lake; blue pigments such as Cobalt Blue, Alkali Blue, Victoria Blue lake. Phthalocyanine Blue, Metal-free Phthalocyanine Blue, partial chlorination product of Phthalocyanine Blue, Fast Sky Blue, and Indanthrene Blue BC; green pigments such as Chrome Green, chromium oxide, Pigment Green B, and Malachite Green Lake; black pigments such as azine dyes (e.g., carbon black, oil furnace black, channel black, lamp black, acetylene black, aniline black), metal salt azo dyes, metal oxides, and combined metal oxides; and white pigments such as titanium oxide. Two or more of these colorants can be used in combination. The transparent toner may contain no colorant.

Specific examples of the release agent include, but are not limited to, polyolefins (e.g., polyethylene, polypropylene), fatty acid metal salts, fatly acid esters, paraffin waxes, amide waxes, polyvalent alcohol waxes, silicone varnishes, carnauba waxes, and ester waxes. Two or more of these materials can be used in combination.

The toner may further contain a charge controlling agent. Specific examples of the charge controlling agent include, but are not limited to: nigrosine; azine dyes having an alkyl group having 2 to 16 carbon atoms; basic dyes such as C. I. Basic Yellow 2 (C. I. 41000), C. I. Basic Yellow 3, C. I. Basic Red 1 (C. I. 45160), C. I. Basic Red 9 (C. I. 42500), C. I. Basic Violet 1 (C. I. 42535), C. I. Basic Violet 3 (C. I. 42555), C. I. Basic Violet 10 (C. I. 45170), C. I. Basic Violet 14 (C. I. 42510), C. I. Basic Blue 1 (C. I. 42025), C. I. Basic Blue 3 (C. I. 51005), C. I. Basic Blue 5 (C. I. 42140), C. I. Basic Blue 7 (C. I. 42595), C. I. Basic Blue 9 (C. I. 52015), C. I. Basic Blue 24 (C. I. 52030), C. I. Basic Blue 25 (C. I. 52025), C. I. Basic Blue 26 (C. I. 44045), C. I. Basic Green 1 (C. I. 42040), and C. I. Basic Green 4 (C. I. 42000); lake pigments of these basic dyes; quaternary ammonium salts such as C. I. Solvent Black 8 (C. I. 26150), benzoylmethylhexadecyl ammonium chloride, and decyltrimethyl chloride; dialkyl (e.g., dibutyl, dioctyl) tin compounds; dialkyl tin borate compounds; guanidine derivatives; polyamine resins such as vinyl polymers having amino group and condensed polymers having amino group; metal complex salts of monoazo dyes; metal complexes of salicylic acid, dialkyl salicylic acid, naphthoic acid, and dicarboxylic acid with Zn, Al, Co, Cr, and Fe; sulfonated copper phthalocyanine pigments; organic boron salts; fluorine-containing quaternary ammonium salts; and calixarene compounds. Two or more of these materials can be used in combination. For color toners other than black toner, metal salts of salicylic acid derivatives, which are w % bite, are preferred.

Specific examples of the external additive include, but are not limited to, inorganic particles such as silica, titanium oxide, alumina, silicon carbide, silicon nitride, and boron nitride, and resin particles such as polymethyl methacrylate particles and polystyrene particles having an average particle diameter of from 0.05 to 1 μm, obtainable by soap-free emulsion polymerization. Two or more of these materials can be used in combination. Among these, metal oxide particles (e.g., silica, titanium oxide) whose surfaces are hydrophobized are preferred. When a hydrophobized silica and a hydrophobized titanium oxide are used in combination with the amount of the hydrophobized titanium oxide greater than that of the hydrophobized silica, the toner provides excellent charge stability regardless of humidity.

The electrophotographic image forming method according to an embodiment of the present invention forms an image using the developer according to an embodiment of the present invention. The electrophotographic image forming apparatus according to an embodiment of the present invention contains the developer according to an embodiment of the present invention.

Specifically, the electrophotographic image forming method according to an embodiment of the present invention includes the processes of: forming an electrostatic latent image on an electrostatic latent image bearer (including charging the electrostatic latent image bearer and irradiating the electrostatic latent image bearer to form the electrostatic latent image thereon); developing the electrostatic latent image formed on the electrostatic latent image bearer with the developer according to an embodiment of the present invention to form a toner image; transferring the toner image formed on the electrostatic latent image bearer onto a recording medium; and fixing the toner image on the recording medium. The method further includes other processes, as necessary.

The electrophotographic image forming apparatus according to an embodiment of the present invention includes: an electrostatic latent image bearer; a charger configured to charge the electrostatic latent image bearer; an irradiator configured to form an electrostatic latent image on the electrostatic latent image bearer; a developing device containing the developer according to an embodiment of the present invention, configured to develop the electrostatic latent image formed on the electrostatic latent image bearer with the developer to form a toner image; a transfer device configured to transfer the toner image formed on the electrostatic latent image bearer onto a recording medium; and a fixing device configured to fix the toner image on the recording medium. The image forming apparatus may further include other devices such as a neutralizer, a cleaner, a recycler, and a controller, as necessary.

The drawing is a schematic diagram illustrating a process cartridge according to an embodiment of the present invention. This process cartridge includes a photoconductor 20, a charger 32 in a proximity-type brush shape, a developing device 40 containing the developer according to an embodiment of the present invention, and a cleaner having a cleaning blade 61, and is detachably mountable on an image forming apparatus body. These constituent elements are integrally combined to constitute the process cartridge. The process cartridge is configured to be detachably mountable on an image forming apparatus body such as a copier and a printer.

EXAMPLES

Hereinafter, the present invention is described in more detail with reference to Examples and Comparative Examples. However, the present invention is not limited to these Examples. In the following descriptions, "parts" represents "parts by mass" and "%" represents "% by mass" unless otherwise specified.

Preparation of Toner

Binder Resin Synthesis Example 1

In a reaction vessel equipped with a condenser tube, a stirrer, and a nitrogen introducing tube, 724 parts of ethylene oxide 2 mol adduct of bisphenol A, 276 parts of isophthalic acid, and 2 parts of dibutyltin oxide were allowed to react at 230° C. for 8 hours under normal pressures and subsequently 5 hours under reduced pressures of from 10 to 15 mmHg. After reducing the temperature to 160° C., 32 parts of phthalic anhydride were put in the vessel and allowed to react for 2 hours.

After being cooled to 80° C., the vessel contents were further allowed to react with 188 parts of isophorone diisocyanate in ethyl acetate for 2 hours. Thus, an isocyanate-containing prepolymer (P1) was prepared.

Next, 267 parts of the prepolymer (P1) were allowed to react with 14 parts of isophoronediamine at 50° C. for 2 hours. Thus, an urea-modified polyester (U1) having a weight average molecular weight of 64,000 was prepared.

In the same manner as described above, 724 parts of ethylene oxide 2 mol adduct of bisphenol A and 276 parts of terephthalic acid were allowed to polycondensate at 230° C. for 8 hours under normal pressures and subsequently react for 5 hours under reduced pressures of from 10 to 15 mmHg. Thus, an unmodified polyester (E1) having a peak molecular weight of 5,000 was prepared.

Next, 200 parts of the urea-modified polyester (U1) and 800 parts of the unmodified polyester (E1) were dissolved in 2,000 parts of a mixed solvent of ethyl acetate/MEK (methyl ethyl ketone), where the mixing ratio was 1/1. Thus, an ethyl acetate/MEK solution of a binder resin (B1) was prepared.

A part of the solution was dried under reduced pressures to isolate the binder resin (B1).

Master Batch Preparation Example 1

Pigment: C.I. Pigment Yellow 155: 40 parts
Binder resin: Polyester resin A: 60 parts
Water: 30 parts

Polyester Resin A Synthesis Example

Terephthalic acid; 60 parts
Dodecenyl succinic anhydride: 25 parts
Trimellitic anhydride: 15 parts
Bisphenol A (2,2) propylene oxide: 70 parts
Bisphenol A (2,2) ethylene oxide: 50 parts The above materials were put in a 1-liter four-necked round-bottom flask equipped with a thermometer, a stirrer, a condenser, and a nitrogen gas introducing tube. The flask was set in a mantle heater and charged with nitrogen gas through the nitrogen gas introducing tube. The flask was heated with an inert gas atmosphere maintained inside the flask. While the flask was kept at 200° C., 0.05 g of dibutyltin oxide were added to the flask and allowed to react. Thus, a polyester resin A was obtained.

The above materials were mixed using a HENSCHEL MIXER to prepare a pigment aggregation into which water had permeated. The pigment aggregation was kneaded for 45 minutes by a double roll with its surface temperature set at 130° C. and then pulverized by a pulverizer into particles having a diameter of about 1 mm. Thus, a master batch (M1) was prepared.

Toner Production Example A

In a beaker, 240 parts of the ethyl acetate/MEK solution of the binder resin (B1), 20 parts of pentaerythritol tetrabehenate (having a melting point of 81° C. and a melt viscosity of cps), and 8 parts of the master batch (M1) were stirred with a TK HOMOMIXER at 12,000 rpm and 60° C. for uniform dissolution and dispersion. Thus, a toner material liquid was prepared.

In another beaker, 700 parts of ion-exchange water, 300 parts of a 10% hydroxyapatite suspension liquid (SUPATAITO 10, product of NIPPON CHEMICAL INDUSTRIAL CO., LTD.), and 0.2 parts of sodium dodecylbenzenesulfonate were uniformly dissolved and heated to 60° C. The above-prepared toner material liquid was put in this beaker while being stirred with a TK HOMOMIXER at 12,000 rpm, and the stirring was continued for 10 minutes.

The resulting mixture was transferred to a flask equipped with a stirrer and a thermometer and heated to 98° C. to remove the solvent, then subjected to filtration, washing, drying, and wind-power classification. Thus, a mother toner particle A was prepared.

Next, 100 parts of the mother toner particle A was mixed with 1.2 parts of a hydrophobic silica and 1.0 part of a hydrophobic titanium oxide using a HENSCHEL MIXER. Thus, a toners A was prepared.

The particle diameter of the toner was measured using a particle size analyzer COULTER COUNTER TA-II (product of Beckman Coulter, Inc. (formerly Coulter Electronics)) with an aperture diameter of 100 μm. As a result, the toner A was found to have a volume average particle diameter (Dv) of 6.2 μm and a number average particle diameter (Dn) of 5.1 μm.

Preparation of Carrier

Carrier Production Example 1

Core Particle A

Mn—Mg—Sr ferrite having an internal void ratio of 1.9%, an apparent density of 2.0 g/cm$^3$, a surface roughness Rz of 2.5 μm, a σ1000 of 63 $Am^2$/kg, and an average particle diameter of 36 μm Composition of Resin Liquid 1

Acrylic resin solution (having a solid content concentration of 20% by mass): 200 parts by mass Silicone resin solution (having a solid content concentration of 40% by mass): 2.000 parts by mass Aminosilane (having a solid content concentration of 100% by mass): 30 parts by mass Tungsten-oxide-doped tin oxide (having a powder resistivity of 40 Ω·cm): 1,200 parts by mass Barium sulfate (having an average particle diameter of 0.4 μm): 650 parts by mass Toluene: 6,000 parts by mass Dispersant (phosphate-based surfactant): 10 parts by mass The above materials for the resin liquid 1 were subjected to a dispersion treatment using a HOMOMIXER for 10 minutes, thus obtaining a coating layer forming liquid.

The surface of the core particle A was coated with the coating layer forming liquid (i.e., resin liquid 1) using a SPIRA COTA (product of Okada Seiko Co., Ltd.) at a rate of 30 g/min in an atmosphere having a temperature of 55° C., followed by drying, so that the thickness of the coating layer became 0.6 μm. The thickness of the resulting layer was adjusted by adjusting the amount of the resin liquid. The core particle having the coating layer thereon was burnt in an electric furnace at 150° C. for 1 hour, then cooled, and pulverized with a sieve having an opening of 100 μm. Thus, a carrier 1 was prepared.

Carrier Production Example 2

Core Particle B

Mn—Mg—Sr ferrite having an internal void ratio of 1.6%, an apparent density of 2.3 g/$cm^3$, a surface roughness Rz of 2.0 μm, a σ1000 of 63 $Am^2$/kg, and an average particle diameter of 36 μm Composition of Resin Liquid 2

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Barium sulfate (having an average particle diameter of 0.4 μm): 650 parts by mass Toluene: 6,000 parts by mass Dispersant (phosphate-based surfactant): 180 parts by mass A carrier 2 was prepared in the same manner as in Production Example 1 except for replacing the core particle and the resin liquid with the core particle B and the resin liquid 2, respectively.

Carrier Production Example 3

Core Particle C

Mn—Mg—Sr ferrite having an internal void ratio of 1.9%, an apparent density of 1.8 g/$cm^3$, a surface roughness Rz of 2.8 μm, a σ1000 of 63 $Am^2$/kg, and an average particle diameter of 36 μm A carrier 3 was prepared in the same manner as in Production Example 1 except for replacing the core particle with the core particle C.

Carrier Production Example 4

Core Particle D

Mn—Mg—Sr ferrite having an internal void ratio of 0.7%, an apparent density of 2.5 g/$cm^3$, a surface roughness Rz of 1.6 μm, a σ1000 of 63 $Am^2$/kg, and an average particle diameter of 36 μm A carrier 4 was prepared in the same manner as in Production Example 2 except for replacing the core particle with the core particle D.

Carrier Production Example 5

Core Particle E

Mn—Mg—Sr ferrite having an internal void ratio of 1.4%, an apparent density of 2.2 g/$cm^3$, a surface roughness Rz of 2.4 μm, a σ1000 of 63 $Am^2$/kg, and an average particle diameter of 36 μm Composition of Resin Liquid 3

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 35 parts by mass Tungsten-oxide-doped tin oxide (having a powder resistivity of 40 Ω·cm): 1,200 parts by mass Toluene: 6,000 parts by mass Dispersant (phosphate-based surfactant): 24 parts by mass A carrier 5 was prepared in the same manner as in Production Example 1 except for replacing the core particle and the resin liquid with the core particle E and the resin liquid 3, respectively.

Carrier Production Example 6

Composition of Resin Liquid 4

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Barium sulfate (having an average particle diameter of 0.4 μm): 650 parts by mass Toluene: 6,000 parts by mass A carrier 6 was prepared in the same manner as in Production Example 5 except for replacing the resin liquid with the resin liquid 4.

Carrier Production Example 7

Composition of Resin Liquid 5

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Barium sulfate (having an average particle diameter of 0.4 μm): 650 parts by mass Toluene: 6,000 parts by mass—Dispersant (phosphate-based surfactant): 40 parts by mass Defoamer (silicone-based): 500 parts by mass A carrier 7 was prepared in the same manner as in Production Example 5 except for replacing the resin liquid with the resin liquid 5.

Carrier Production Example 8

Core Particle F

Mn—Mg—Sr ferrite having an internal void ratio of 2.1%, an apparent density of 2.2 g/cm$^3$, a surface roughness Rz of 1.8 μm, a σ1000 of 63 Am/kg, and an average particle diameter of 36 μm A carrier 8 was prepared in the same manner as in Production Example 7 except for replacing the core particle with the core particle F.

Carrier Production Example 9

Core Particle G

Mn—Mg—Sr ferrite having an internal void ratio of 1.8%, an apparent density of 2.3 g/cm$^3$, a surface roughness Rz of 1.9 μm, a σ1000 of 63 Am$^2$/kg, and an average particle diameter of 36 μm A carrier 9 was prepared in the same manner as in Production Example 7 except for replacing the core particle with the core particle G.

Carrier Production Example 10

Core Particle H

Mn—Mg—Sr ferrite having an internal void ratio of 1.7%, an apparent density of 2.2 g/cm$^3$, a surface roughness Rz of 2.1 μm, a σ1000 of 63 Am$^2$/kg, and an average particle diameter of 36 μm A carrier 10 was prepared in the same manner as in Production Example 7 except for replacing the core particle with the core particle H.

Carrier Production Example 11

Core Particle I

Mn—Mg—Sr ferrite having an internal void ratio of 0.4%, an apparent density of 2.0 g/cm$^3$, a surface roughness Rz of 2.9 μm, a σ1000 of 63 Am$^2$/kg, and an average particle diameter of 36 μm A carrier 11 was prepared in the same manner as in Production Example 7 except for replacing the core particle with the core particle I.

Carrier Production Example 12

Core Particle J

Mn—Mg—Sr ferrite having an internal void ratio of 0.3%, an apparent density of 2.0 g/cm$^3$, a surface roughness Rz of 3.1 μm, a σ1000 of 63 Am/kg, and an average particle diameter of 36 μm A carrier 12 was prepared in the same manner as in Production Example 7 except for replacing the core particle with the core particle J.

Carrier Production Example 13

Composition of Resin Liquid 6

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Magnesium oxide (having an average particle diameter of 0.05 μm): 650 parts by mass Toluene: 6,000 parts by mass—Dispersant (phosphate-based surfactant): 40 parts by mass Defoamer (silicone-based): 500 parts by mass A carrier 13 was prepared in the same manner as in Production Example 7 except for replacing the resin liquid with the resin liquid 6.

Carrier Production Example 14

Composition of Resin Liquid 7

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Magnesium hydroxide (having an average particle diameter of 0.1 μm): 650 parts by mass Toluene: 6,000 parts by mass Dispersant (phosphate-based surfactant): 40 parts by mass Defoamer (silicone-based): 500 parts by mass A carrier 14 was prepared in the same manner as in Production Example 7 except for replacing the resin liquid with the resin liquid 7.

Carrier Production Example 15

Composition of Resin Liquid 8

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Hydrotalcite (having an average particle diameter of 0.5 μm): 650 parts by mass Toluene: 6,000 parts by mass Dispersant (phosphate-based surfactant): 40 parts by mass Defoamer (silicone-based): 500 parts by mass A carrier 15 was prepared in the same manner as in Production Example 7 except for replacing the resin liquid with the resin liquid 8.

Carrier Production Example 16

Composition of Resin Liquid 9

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Alumina (having an average particle diameter of 0.4 μm): 650 parts by mass Toluene: 6,000 parts by mass Dispersant (phosphate-based surfactant): 40 parts by mass Defoamer (silicone-based): 500 parts by mass A carrier 16 was prepared in the same manner as in Production Example 7 except for replacing the resin liquid with the resin liquid 9.

Carrier Production Example 17

Composition of Resin Liquid 10

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Tungsten-oxide-doped tin oxide (having a powder resistivity of 40 Ω·cm): 1,200 parts by mass Barium sulfate (having an average particle diameter of 0.4 μm): 150 parts by mass Toluene: 6,000 parts by mass Dispersant (phosphate-based surfactant): 40 parts by mass Defoamer (silicone-based): 500 parts by mass A carrier 17 was prepared in the same manner as in Production Example 7 except for replacing the resin liquid with the resin liquid 10.

Carrier Production Example 18

Composition of Resin Liquid 11

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Carbon (Ketjen black): 900 parts by mass Barium sulfate (having an average particle diameter of 0.4 μm): 650 parts by mass Toluene: 6,000 parts by mass Dispersant (phosphate-based surfactant): 40 parts by mass Defoamer (silicone-based): 500 parts by mass A carrier 18 was prepared in the same manner as in Production Example 7 except for replacing the resin liquid with the resin liquid 11.

Carrier Production Example 19

Composition of Resin Solution 12

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Indium-oxide-doped tin oxide (having a powder resistivity of 40 Ω·cm): 1,200 parts by mass Barium sulfate (having an average particle diameter of 0.4 μm): 650 parts by mass Toluene: 6,000 parts by mass Dispersant (phosphate-based surfactant): 40 parts by mass Defoamer (silicone-based): 500 parts by mass A carrier 19 was prepared in the same manner as in Production Example 7 except for replacing the resin liquid with the resin liquid 12.

Carrier Production Example 20

Composition of Resin Solution 13

Acrylic resin solution (having a solid content concentration of 20% by mass): 200 parts by mass Silicone resin solution (having a solid content concentration of 40% by mass): 2,000 parts by mass Aminosilane (having a solid content concentration of 100% by mass): 30 parts by mass Phosphorus-pentoxide-doped tin oxide (having a powder resistivity of 40 Ω·cm): 1,200 parts by mass Barium sulfate (having an average particle diameter of 0.4 μm): 650 parts by mass Toluene: 6,000 parts by mass Dispersant (phosphate-based surfactant): 40 parts by mass Defoamer (silicone-based): 500 parts by mass A carrier 20 was prepared in the same manner as in Production Example 7 except for replacing the resin liquid with the resin liquid 13.

Carrier Production Example 21

Core Particle K

Mn ferrite having an internal void ratio of 0.5%, an apparent density of 2.2 g/cm$^3$, a surface roughness Rz of 2.3 μm, a σ1000 of 70 Am/kg, and an average particle diameter of 36 μm A carrier 21 was prepared in the same manner as in Production Example 7 except for replacing the core particle with the core particle K.

Carrier Production Example 22

Core Particle L

Mn ferrite having an internal void ratio of 0.5%, an apparent density of 2.2 g/cm$^3$, a surface roughness Rz of 2.3 μm, a σ1000 of 65 Am$^2$/kg, and an average particle diameter of 36 μm A carrier 22 was prepared in the same manner as in Production Example 7 except for replacing the core particle with the core particle L.

Carrier Production Example 23

Core Particle M

Mn ferrite having an internal void ratio of 0.5%, an apparent density of 2.2 g/cm$^3$, a surface roughness Rz of 2.3 μm, a σ1000 of 67 Am$^2$/kg, and an average particle diameter of 36 μm A carrier 23 was prepared in the same manner as in Production Example 7 except for replacing the core particle with the core particle M.

Carrier Production Example 24

Core Particle N

Mn ferrite having an internal void ratio of 0.5%, an apparent density of 2.2 g/cm$^3$, a surface roughness Rz of 2.3 μm, a σ1000 of 74 Am/kg, and an average particle diameter of 36 μm A carrier 24 was prepared in the same manner as in Production Example 7 except for replacing the core particle with the core particle N.

Carrier Production Example 25

Core Particle O

Mn ferrite having an internal void ratio of 0.5%, an apparent density of 2.2 g/cm$^3$, a surface roughness Rz of 2.3 μm, a σ1000 of 76 Am$^2$/kg, and an average particle diameter of 36 μm A carrier 25 was prepared in the same manner as in Production Example 7 except for replacing the core particle with the core particle O.

Carrier Production Example 26

Composition of Resin Solution 14

- Acrylic resin solution (having a solid content concentration of 20% by mass): 200 parts by mass
- Silicone resin solution (having a solid content concentration of 40% by mass): 2,000 parts by mass
- Aminosilane (having a solid content concentration of 100% by mass): 30 parts by mass
- Tungsten-oxide-doped tin oxide (having a powder resistivity of 40 Ω·cm): 1,200 parts by mass
- Barium sulfate (having an average particle diameter of 0.4 μm): 650 parts by mass
- Toluene: 6,000 parts by mass
- Dispersant (carboxylic-acid-based surfactant): 40 parts by mass
- Defoamer (silicone-based): 500 parts by mass A carrier 26 was prepared in the same manner as in Production Example 21 except for replacing the resin liquid with the resin liquid 14.

Carrier Production Example 27

Composition of Resin Solution 15

- Acrylic resin solution (having a solid content concentration of 20% by mass): 200 parts by mass
- Silicone resin solution (having a solid content concentration of 40% by mass): 2,000 parts by mass
- Aminosilane (having a solid content concentration of 100% by mass): 30 parts by mass
- Tungsten-oxide-doped tin oxide (having a powder resistivity of 40 Ω·cm): 1,200 parts by mass
- Barium sulfate (having an average particle diameter of 0.4 μm): 650 parts by mass
- Toluene: 6,000 parts by mass
- Dispersant (sulfone-based surfactant): 40 parts by mass
- Defoamer (silicone-based): 500 parts by mass A carrier 27 was prepared in the same manner as in Production Example 21 except for replacing the resin liquid with the resin liquid 15.

Carrier Production Example 28

Composition of Resin Solution 16

- Acrylic resin solution (having a solid content concentration of 20% by mass): 200 parts by mass
- Silicone resin solution (having a solid content concentration of 40% by mass): 2,000 parts by mass
- Aminosilane (having a solid content concentration of 100% by mass): 30 parts by mass
- Tungsten-oxide-doped tin oxide (having a powder resistivity of 40 Ω·cm): 1,200 parts by mass
- Barium sulfate (having an average particle diameter of 0.4 μm): 650 parts by mass
- Toluene: 6,000 parts by mass
- Dispersant (sulfate-based surfactant): 40 parts by mass
- Defoamer (silicone-based): 500 parts by mass A carrier 28 was prepared in the same manner as in Production Example 21 except for replacing the resin liquid with the resin liquid 16.

Carrier Production Example 29

Composition of Resin Solution 17

- Acrylic resin solution (having a solid content concentration of 20% by mass): 200 parts by mass
- Silicone resin solution (having a solid content concentration of 40% by mass): 2,000 parts by mass
- Aminosilane (having a solid content concentration of 100% by mass): 30 parts by mass
- Tungsten-oxide-doped tin oxide (having a powder resistivity of 40 Ω·cm): 1,200 parts by mass
- Barium sulfate (having an average particle diameter of 0.4 μm): 650 parts by mass
- Toluene: 6,000 parts by mass
- Dispersant (phosphate-based surfactant): 40 parts by mass
- Defoamer (acrylic-based): 500 parts by mass A carrier 29 was prepared in the same manner as in Production Example 21 except for replacing the resin liquid with the resin liquid 17.

Carrier Production Example 30

Composition of Resin Solution 18

- Acrylic resin solution (having a solid content concentration of 20% by mass): 200 parts by mass
- Silicone resin solution (having a solid content concentration of 40% by mass): 2,000 parts by mass
- Aminosilane (having a solid content concentration of 100% by mass): 30 parts by mass
- Tungsten-oxide-doped tin oxide (having a powder resistivity of 40 Ω·cm): 1,200 parts by mass
- Barium sulfate (having an average particle diameter of 0.4 μm): 650 parts by mass
- Toluene: 6,000 parts by mass
- Dispersant (phosphate-based surfactant): 40 parts by mass
- Defoamer (vinyl-based): 500 parts by mass A carrier 30 was prepared in the same manner as in Production Example 21 except for replacing the resin liquid with the resin liquid 18.

Carrier Production Example 31

Composition of Resin Solution 19

- Acrylic resin solution (having a solid content concentration of 20% by mass): 200 parts by mass
- Silicone resin solution (having a solid content concentration of 40% by mass): 2,000 parts by mass
- Aminosilane (having a solid content concentration of 100% by mass): 30 parts by mass
- Alumina surface-treated with tungsten-oxide-doped tin oxide (having a powder resistivity of 40 Ω·cm): 1,400 parts by mass
- Barium sulfate (having an average particle diameter of 0.4 μm): 650 parts by mass
- Toluene: 6,000 parts by mass
- Dispersant (phosphate-based surfactant): 40 parts by mass
- Defoamer (silicone-based): 500 parts by mass A carrier 31 was prepared in the same manner as in Production Example 21 except for replacing the resin liquid with the resin liquid 19.

Properties of the carriers prepared in Carrier Production Examples 1 to 31 are presented in Tables 1-1 to 1-3.

TABLE 1-1

| | | Core Particle | | | | | |
|---|---|---|---|---|---|---|---|
| | | Core Particle | Material | Internal Void Ratio (%) | Apparent Density (g/cm$^3$) | Surface Roughness Rz (μm) | Magnetization σ1000 (Am$^2$/kg) |
| Production Example 1 | Carrier 1 | Core Particle A | Mn—Mg—Sr ferrite | 1.9 | 2.0 | 2.5 | 63 |
| Production Example 2 | Carrier 2 | Core Particle B | Mn—Mg—Sr ferrite | 1.6 | 2.3 | 2.0 | 63 |
| Production Example 3 | Carrier 3 | Core Particle C | Mn—Mg—Sr ferrite | 1.9 | 1.8 | 2.8 | 63 |
| Production Example 4 | Carrier 4 | Core Particle D | Mn—Mg—Sr ferrite | 0.7 | 2.5 | 1.6 | 63 |
| Production Example 5 | Carrier 5 | Core Particle E | Mn—Mg—Sr ferrite | 1.4 | 2.2 | 2.4 | 63 |
| Production Example 6 | Carrier 6 | Core Particle E | Mn—Mg—Sr ferrite | 1.4 | 2.2 | 2.4 | 63 |
| Production Example 7 | Carrier 7 | Core Particle E | Mn—Mg—Sr ferrite | 1.4 | 2.2 | 2.4 | 63 |
| Production Example 8 | Carrier 8 | Core Particle F | Mn—Mg—Sr ferrite | 2.1 | 2.2 | 1.8 | 63 |
| Production Example 9 | Carrier 9 | Core Particle G | Mn—Mg—Sr ferrite | 1.8 | 2.3 | 1.9 | 63 |
| Production Example 10 | Carrier 10 | Core Particle H | Mn—Mg—Sr ferrite | 1.7 | 2.2 | 2.1 | 63 |
| Production Example 11 | Carrier 11 | Core Particle I | Mn—Mg—Sr ferrite | 0.4 | 2.0 | 2.9 | 63 |
| Production Example 12 | Carrier 12 | Core Particle J | Mn—Mg—Sr ferrite | 0.3 | 2.0 | 3.1 | 63 |
| Production Example 13 | Carrier 13 | Core Particle E | Mn—Mg—Sr ferrite | 1.4 | 2.2 | 2.4 | 63 |
| Production Example 14 | Carrier 14 | Core Particle E | Mn—Mg—Sr ferrite | 1.4 | 2.2 | 2.4 | 63 |
| Production Example 15 | Carrier 15 | Core Particle E | Mn—Mg—Sr ferrite | 1.4 | 2.2 | 2.4 | 63 |
| Production Example 16 | Carrier 16 | Core Particle E | Mn—Mg—Sr ferrite | 1.4 | 2.2 | 2.4 | 63 |
| Production Example 17 | Carrier 17 | Core Particle E | Mn—Mg—Sr ferrite | 1.4 | 2.2 | 2.4 | 63 |
| Production Example 18 | Carrier 18 | Core Particle E | Mn—Mg—Sr ferrite | 1.4 | 2.2 | 2.4 | 63 |
| Production Example 19 | Carrier 19 | Core Particle E | Mn—Mg—Sr ferrite | 1.4 | 2.2 | 2.4 | 63 |
| Production Example 20 | Carrier 20 | Core Particle E | Mn—Mg—Sr ferrite | 1.4 | 2.2 | 2.4 | 63 |
| Production Example 21 | Carrier 21 | Core Particle K | Mn ferrite | 0.5 | 2.2 | 2.3 | 70 |
| Production Example 22 | Carrier 22 | Core Particle L | Mn ferrite | 0.5 | 2.2 | 2.3 | 65 |
| Production Example 23 | Carrier 23 | Core Particle M | Mn ferrite | 0.5 | 2.2 | 2.3 | 67 |
| Production Example 24 | Carrier 24 | Core Particle N | Mn ferrite | 0.5 | 2.2 | 2.3 | 74 |
| Production Example 25 | Carrier 25 | Core Particle O | Mn ferrite | 0.5 | 2.2 | 2.3 | 76 |
| Production Example 26 | Carrier 26 | Core Particle K | Mn ferrite | 0.5 | 2.2 | 2.3 | 70 |
| Production Example 27 | Carrier 27 | Core Particle K | Mn ferrite | 0.5 | 2.2 | 2.3 | 70 |
| Production Example 28 | Carrier 28 | Core Particle K | Mn ferrite | 0.5 | 2.2 | 2.3 | 70 |
| Production Example 29 | Carrier 29 | Core Particle K | Mn ferrite | 0.5 | 2.2 | 2.3 | 70 |
| Production Example 30 | Carrier 30 | Core Particle K | Mn ferrite | 0.5 | 2.2 | 2.3 | 70 |
| Production Example 31 | Carrier 31 | Core Particle K | Mn ferrite | 0.5 | 2.2 | 2.3 | 70 |

TABLE 1-2

| | | Formulation | | | | | |
|---|---|---|---|---|---|---|---|
| | | Dispersant | | Defoamer | | | |
| | | | Parts per 100 parts of Total Filler | | Parts per 100 parts of Coaling Liquid | Chargeable Particles | Conductive Particles |
| Production Example 1 | Carrier 1 | Phosphate-based | 0.5 | — | — | Barium Sulfate | Tungsten-oxide-doped tin oxide |
| Production Example 2 | Carrier 2 | Phosphate-based | 9.7 | — | — | Barium Sulfate | Tungsten-oxide-doped tin oxide |
| Production Example 3 | Carrier 3 | Phosphate-based | 0.5 | — | — | Barium Sulfate | Tungsten-oxide-doped tin oxide |
| Production Example 4 | Carrier 4 | Phosphate-based | 9.7 | — | — | Barium Sulfate | Tungsten-oxide-doped tin oxide |
| Production Example 5 | Carrier 5 | Phosphate-based | 2.0 | — | — | None | Tungsten-oxide-doped tin oxide |
| Production Example 6 | Carrier 6 | — | — | — | — | Barium Sulfate | Tungsten-oxide-doped tin oxide |
| Production Example 7 | Carrier 7 | Phosphate-based | 2.2 | Silicone-based | 4.7 | Barium Sulfate | Tungsten-oxide-doped tin oxide |
| Production Example 8 | Carrier 8 | Phosphate-based | 2.2 | Silicone-based | 4.7 | Barium Sulfate | Tungsten-oxide-doped tin oxide |
| Production Example 9 | Carrier 9 | Phosphate-based | 2.2 | Silicone-based | 4.7 | Barium Sulfate | Tungsten-oxide-doped tin oxide |
| Production Example 10 | Carrier 10 | Phosphate-based | 2.2 | Silicone-based | 4.7 | Barium Sulfate | Tungsten-oxide-doped tin oxide |
| Production Example 11 | Carrier 11 | Phosphate-based | 2.2 | Silicone-based | 4.7 | Barium Sulfate | Tungsten-oxide-doped tin oxide |
| Production Example 12 | Carrier 12 | Phosphate-based | 2.2 | Silicone-based | 4.7 | Barium Sulfate | Tungsten-oxide-doped tin oxide |
| Production Example 13 | Carrier 13 | Phosphate-based | 2.2 | Silicone-based | 4.7 | Magnesium oxide | Tungsten-oxide-doped tin oxide |
| Production Example 14 | Carrier 14 | Phosphate-based | 2.2 | Silicone-based | 4.7 | Magnesium hydroxide | Tungsten-oxide-doped tin oxide |
| Production Example 15 | Carrier 15 | Phosphate-based | 2.2 | Silicone-based | 4.7 | Hydrotalcite | Tungsten-oxide-doped tin oxide |
| Production Example 16 | Carrier 16 | Phosphate-based | 2.2 | Silicone-based | 4.7 | Alumina | Tungsten-oxide-doped tin oxide |
| Production Example 17 | Carrier 17 | Phosphate-based | 3.0 | Silicone-based | 4.9 | Barium Sulfate | Tungsten-oxide-doped tin oxide |
| Production Example 18 | Carrier 18 | Phosphate-based | 2.6 | Silicone-based | 4.8 | Barium Sulfate | Carbon black |
| Production Example 19 | Carrier 19 | Phosphate-based | 2.2 | Silicone-based | 4.7 | Barium Sulfate | Indium-oxide-doped tin oxide |
| Production Example 20 | Carrier 20 | Phosphate-based | 2.2 | Silicone-based | 4.7 | Barium Sulfate | Phosphorus-pentoxide-doped tin oxide |
| Production Example 21 | Carrier 21 | Phosphate-based | 2.2 | Silicone-based | 4.7 | Barium Sulfate | Tungsten-oxide-doped tin oxide |
| Production Example 22 | Carrier 22 | Phosphate-based | 2.2 | Silicone-based | 4.7 | Barium Sulfate | Tungsten-oxide-doped tin oxide |
| Production Example 23 | Carrier 23 | Phosphate-based | 2.2 | Silicone-based | 4.7 | Barium Sulfate | Tungsten-oxide-doped tin oxide |
| Production Example 24 | Carrier 24 | Phosphate-based | 2.2 | Silicone-based | 4.7 | Barium Sulfate | Tungsten-oxide-doped tin oxide |
| Production Example 25 | Carrier 25 | Phosphate-based | 2.2 | Silicone-based | 4.7 | Barium Sulfate | Tungsten-oxide-doped tin oxide |
| Production Example 26 | Carrier 26 | Carboxylic-acid-based | 2.2 | Silicone-based | 4.7 | Barium Sulfate | Tungsten-oxide-doped tin oxide |
| Production Example 27 | Carrier 27 | Sulfonic-acid-based | 2.2 | Silicone-based | 4.7 | Barium Sulfate | Tungsten-oxide-doped tin oxide |
| Production Example 28 | Carrier 28 | Sulfate-based | 2.2 | Silicone-based | 4.7 | Barium Sulfate | Tungsten-oxide-doped tin oxide |
| Production Example 29 | Carrier 29 | Phosphate-based | 2.2 | Acrylic-based | 4.7 | Barium Sulfate | Tungsten-oxide-doped tin oxide |
| Production Example 30 | Carrier 30 | Phosphate-based | 2.2 | Vinyl-based | 4.7 | Barium Sulfate | Tungsten-oxide-doped tin oxide |
| Production Example 31 | Carrier 31 | Phosphate-based | 2.2 | Silicone-based | 4.7 | Barium Sulfate | Alumina surface-treated with tungsten-oxide-doped tin oxide |

TABLE 1-3

| | | Carrier | | | |
|---|---|---|---|---|---|
| | | Internal Void Ratio (%) | Apparent Density (g/cm$^3$) | Amount of Barium Exposure (atomic %) | Magnetization σ1000 (Am$^2$/kg) |
| Production Example 1 | Carrier 1 | 1.9 | 2.1 | 0.2 | 53 |
| Production Example 2 | Carrier 2 | 1.6 | 2.4 | 0.2 | 53 |
| Production Example 3 | Carrier 3 | 1.9 | 1.9 | 0.2 | 53 |
| Production Example 4 | Carrier 4 | 0.7 | 2.6 | 0.2 | 53 |
| Production Example 5 | Carrier 5 | 1.4 | 2.2 | — | 53 |
| Production Example 6 | Carrier 6 | 1.4 | 2.3 | 0.2 | 53 |
| Production Example 7 | Carrier 7 | 1.4 | 2.3 | 0.2 | 53 |
| Production Example 8 | Carrier 8 | 2.1 | 2.3 | 0.2 | 53 |
| Production Example 9 | Carrier 9 | 1.8 | 2.4 | 0.2 | 63 |
| Production Example 10 | Carrier 10 | 1.7 | 2.3 | 0.2 | 63 |
| Production Example 11 | Carrier 11 | 0.4 | 2.1 | 0.2 | 63 |
| Production Example 12 | Carrier 12 | 0.3 | 2.1 | 0.2 | 63 |
| Production Example 13 | Carrier 13 | 1.4 | 2.3 | — | 53 |
| Production Example 14 | Carrier 14 | 1.4 | 2.3 | — | 53 |
| Production Example 15 | Carrier 15 | 1.4 | 2.3 | — | 53 |
| Production Example 16 | Carrier 16 | 1.4 | 2.3 | — | 53 |
| Production Example 17 | Carrier 17 | 1.4 | 2.3 | 0.03 | 53 |
| Production Example 18 | Carrier 18 | 0.5 | 2.3 | 0.2 | 63 |
| Production Example 19 | Carrier 19 | 0.5 | 2.3 | 0.2 | 63 |
| Production Example 20 | Ca rrier 20 | 0.5 | 2.3 | 0.2 | 63 |
| Production Example 21 | Carrier 21 | 0.5 | 2.3 | 0.2 | 63 |
| Production Example 22 | Carrier 22 | 0.5 | 2.3 | 0.2 | 55 |
| Production Example 23 | Carrier 23 | 0.5 | 2.3 | 0.2 | 57 |
| Production Example 24 | Carrier 24 | 0.5 | 2.3 | 0.2 | 72 |
| Production Example 25 | Carrier 25 | 0.5 | 2.3 | 0.2 | 74 |
| Production Example 26 | Carrier 26 | 0.5 | 2.3 | 0.2 | 63 |
| Production Example 27 | Carrier 27 | 0.5 | 2.3 | 0.2 | 63 |
| Production Example 28 | Carrier 28 | 0.5 | 2.3 | 0.2 | 63 |
| Production Example 29 | Carrier 29 | 0.5 | 2.3 | 0.2 | 63 |
| Production Example 30 | Carrier 30 | 0.5 | 2.3 | 0.2 | 63 |
| Production Example 31 | Carrier 31 | 0.5 | 2.3 | 0.2 | 63 |

Example 1

A developer 1 was prepared by stir-mixing 7 parts by mass of the toner A prepared in Toner Production Example and 93 parts by mass of the carrier 1 prepared in Carrier Production Example 1 using a mixer for 10 minutes.

The developer was set in a commercially-available digital full-color printer (IMAGIO MP C6004SP, product of Ricoh Co., Ltd.), and the initial developer was subjected to evaluations. Next, a text chart having an image area ratio of 5% was output on 50,000 sheets and then an image chart having an image area ratio of 20% was output on 50,000 sheets, i.e., images were output on 100,000 sheets in total, then the developer (hereinafter "developer over time") was subjected to evaluations.

Amount of Decrease of Charge

The amount of decrease of charge before and after the image output on 100,000 sheets was evaluated.

First, 93% by mass of the initial carrier and 7% by mass of the toner were mixed to prepare a triboelectrically-charged sample. The amount of charge of the sample was measured by a general blow-off method (using TB-200, product of Toshiba Chemical Corporation), and this measured amount was defined as an initial amount of charge. Next, the toner was removed from the developer by the blow-off device after the image output. In the same manner as described above, 93% by mass of the resulted carrier and 7% by mass of the fresh toner A were mixed to prepare another triboelectrically-charged sample, and this sample was subjected to the measurement of the amount of charge. The difference between the measured amount of charge and the initial amount of charge was defined as the amount of decrease of charge. The targeted amount of decrease of charge is less than 10 μC/g.

Ghost Image

A solid image was output with the initial developer. The difference in image density between a tip portion of the image and a portion behind the tip portion by a distance equivalent to the peripheral length of the developing roller was visually observed to evaluate the degree of generation of ghost images according to the following criteria.

A+: Very good, A: Good, B: Acceptable, C: Unacceptable for practical use

White Spots (Carrier Deposition)

Using each of the initial developer and the developer over time, a solid image and an image of a 2-dot line (i.e., 100 lpi/inch) pattern in the sub-scanning direction were each output on an A3-size paper sheet. The number of white spots generated by carrier particles deposited on the solid image and between the lines of the 2-dot line pattern was measured by visual observation and ranked according to the following criteria.

A+: Very good, A: Good, B: Acceptable, C: Unacceptable for practical use

Vertical-stripe-like Abnormal Image

The printer was tilted 10 toward the front side, and a solid image was output with the initial developer. The resulted vertical-stripe-like abnormal image was visually observed and ranked according to the following criteria.

A: Good, B: Acceptable, C: Unacceptable for practical use

Color Contamination

A solid image was output with each of the initial developer and the developer after the image output on 100,000 sheets (i.e., developer over time) and subjected to a measurement using an instrument X-RITE.

Specifically, values (i.e., L0*, a0*, b0*, and ID) of a solid image output with the initial developer and values (i.e., L1*, a1*, b1*, and ID') output after the image output on 100,000 sheets were measured using an X-RITE 938 D50 (product of X-Rite Inc.), and ΔE was calculated from the following formula. The degree of color contamination was ranked based on ΔE according to the following criteria.

$$\text{Color difference } \Delta E=\{(L0^*-L1^*)^2+(a0^*-a1^*)^2+(b0^*-b1^*)^2\}^{1/2}$$

L0*, a0*, and b0*: Measured values for the initial developer

L1*, a1*, and b1*: Measured values after the image output on 100.000 sheets

A: $\Delta E \leq 2$

B: $2 < \Delta E \leq 6$

C: $6 < \Delta E$

Ranks A and B are acceptable.

Examples 2 to 27 and Comparative Examples 1 to 4

The evaluations were performed in the same manner as in Example 1 except for replacing the developer with each of the developers 2 to 31 using the respective carriers 2 to 31.

The evaluation results for the developers and carriers of Examples and Comparative Examples are presented in Table 2.

TABLE 2

| | Carrier | Amount of Decrease of Charge (μC/g) | Ghost Image (Rank) | Carrier Deposition Initial Developer (Rank) | Carrier Deposition Developer Over Time (Rank) | Vertical-stripe-like Abnormal Image (Rank) | Color Contamination (Rank) |
|---|---|---|---|---|---|---|---|
| Example 1 | Carrier 1 | 5 | A+ | B | B | A | A |
| Example 2 | Carrier 2 | 5 | B | A | A | A | A |
| Comparative Example 1 | Carrier 3 | 4 | A+ | C | C | A | A |
| Comparative Example 2 | Carrier 4 | 10 | C | A | A | A | A |
| Comparative Example 3 | Carrier 5 | 16 | A | A | B | A | A |
| Comparative Example 4 | Carrier 6 | 13 | A | A | B | A | A |
| Example 3 | Carrier 7 | 8 | A | A | B | A | A |
| Example 4 | Carrier 8 | 9 | A | B | B | A | A |
| Example 5 | Carrier 9 | 6 | B | B | B | A | A |
| Example 6 | Carrier 10 | 4 | A | B | B | A | A |
| Example 7 | Carrier 11 | 4 | A+ | A | B | A | A |
| Example 8 | Carrier 12 | 4 | A+ | A | B | A | A |
| Example 9 | Carrier 13 | 6 | A | B | B | A | A |
| Example 10 | Carrier 14 | 6 | A | B | B | A | A |
| Example 11 | Carrier 15 | 6 | A | B | B | A | A |
| Example 12 | Carrier 16 | 7 | A | B | B | A | A |
| Example 13 | Carrier 17 | 8 | A | B | B | A | A |
| Example 14 | Carrier 18 | 5 | A | A | B | A | B |
| Example 15 | Carrier 19 | 4 | A | A | B | A | A |
| Example 16 | Carrier 20 | 4 | A | A | B | A | A |
| Example 17 | Carrier 21 | 4 | A | A+ | A+ | A | A |
| Example 18 | Carrier 22 | 5 | A | A | A | B | A |
| Example 19 | Carrier 23 | 5 | A | A+ | A+ | A | A |
| Example 20 | Carrier 24 | 4 | A | A+ | A+ | A | A |
| Example 21 | Carrier 25 | 4 | A | A+ | A+ | B | A |
| Example 22 | Carrier 26 | 6 | A | A+ | A+ | A | A |
| Example 23 | Carrier 27 | 6 | A | A+ | A+ | A | A |
| Example 24 | Carrier 28 | 6 | A | A+ | A+ | A | A |
| Example 25 | Carrier 29 | 6 | A | A+ | A+ | A | A |
| Example 26 | Carrier 30 | 6 | A | A+ | A+ | A | A |
| Example 27 | Carrier 31 | 4 | A | A+ | A+ | A | A |

Table 2 indicates that each Example shows practically sufficient or excellent results in the evaluations of "the amount of decrease of charge", "ghost image", "carrier deposition", "vertical-stripe-like abnormal image", and "color contamination". Thus, the carrier according to an embodiment of the present invention has carrier deposition resistance and ghost resistance while maintaining a stable charging ability for an extended period of time.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A carrier for forming an electrophotographic image, comprising:

a core particle; and a coating layer coating the core particle, the coating layer containing chargeable particles and a dispersant, wherein the carrier has an apparent density of from 2.0 $g/cm^3$ or greater but less than 2.5 $g/cm^3$, and wherein the coating layer further contains a defoamer.

2. The carrier according to claim 1, wherein the dispersant is at least one dispersant selected from the group consisting of phosphate ester-based surfactants, sulfate ester-based surfactants, sulfonic-acid-based surfactants, and carboxylic-acid-based surfactants.

3. The carrier according to claim 1, wherein the core particle has an internal void ratio of 0.0% or greater but less than 2.0%.

4. The carrier according to claim 1, wherein the core particle has a surface roughness Rz of 2.0 μm or more but less than 3.0 μm.

5. The carrier according to claim 1, wherein the chargeable particles comprise at least one member selected from the group consisting of barium sulfate, zinc oxide, magnesium oxide, magnesium hydroxide, and hydrotalcite.

6. The carrier according to claim 1, wherein the chargeable particles comprise barium sulfate, and an amount of barium exposed at a surface of the coating layer is 0.1% by atom or greater.

7. The carrier according to claim 1, wherein the coating layer further contains inorganic particles other than the chargeable particles.

8. The carrier according to claim 7, wherein the inorganic particles comprise at least one member selected from the group consisting of:

a doped tin oxide doped with at least one member selected from the group consisting of tungsten, indium, phosphorus, tungsten oxide, indium oxide, and phosphorous oxide; and particles each comprising a base particle and the doped tin oxide on a surface of the base particle.

9. The carrier according to claim 1, wherein the core particle comprises manganese ferrite.

10. The carrier according to claim 1, wherein the carrier has a magnetization of 56 $Am^2/kg$ or greater but less than 73 $Am^2/kg$ in a magnetic field of 1,000 Oe that is equal to 79.58 kA/m.

11. The carrier according to claim 1, wherein the dispersant comprises a phosphate ester-based surfactant.

12. The carrier according to claim 1, wherein the defoamer is a silicone-based defoamer.

13. A developer for forming an electrophotographic image, comprising the carrier according to claim 1.

14. An electrophotographic image forming method comprising forming an electrostatic latent image on an electrostatic latent image bearer;

developing the electrostatic latent image formed on the electrostatic latent image bearer with the developer according to claim 13 to form a toner image;

transferring the toner image formed on the electrostatic latent image bearer onto a recording medium; and fixing the toner image on the recording medium.

15. An electrophotographic image forming apparatus comprising:

an electrostatic latent image bearer;

a charger configured to charge the electrostatic latent image bearer;

an irradiator configured to form an electrostatic latent image on the electrostatic latent image bearer;

a developing device containing the developer according to claim 13, the developing device configured to develop the electrostatic latent image formed on the electrostatic latent image bearer with the developer to form a toner image;

a transfer device configured to transfer the toner image formed on the electrostatic latent image bearer onto a recording medium; and a fixing device configured to fix the toner image on the recording medium.

16. A process cartridge detachably mountable on an electrophotographic image forming apparatus, comprising an electrostatic latent image bearer;

a charger configured to charge the electrostatic latent image bearer;

a developing device containing the developer according to claim 13, the developing device configured to develop the electrostatic latent image formed on the electrostatic latent image bearer with the developer to form a toner image;

a cleaner configured to clean the electrostatic latent image bearer.

* * * * *